(12) United States Patent
Roehrle et al.

(10) Patent No.: US 8,024,303 B2
(45) Date of Patent: Sep. 20, 2011

(54) SOFTWARE RELEASE VALIDATION

(75) Inventors: Burkhard Roehrle, Harrenberg (DE); Pierre Horvath, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1519 days.

(21) Appl. No.: 11/193,815

(22) Filed: Jul. 29, 2005

(65) Prior Publication Data
US 2007/0027934 A1 Feb. 1, 2007

(51) Int. Cl.
*G06F 17/30* (2006.01)
(52) U.S. Cl. .................................................. 707/694
(58) Field of Classification Search .................. None
See application file for complete search history.

(56) References Cited

U.S. PATENT DOCUMENTS

| | | | |
|---|---|---|---|
| 5,423,023 A | 6/1995 | Batch et al. | |
| 5,765,140 A | 6/1998 | Knudson et al. | |
| 5,826,020 A | 10/1998 | Randell | |
| 5,826,252 A | 10/1998 | Wolters, Jr. et al. | |
| 5,999,911 A | 12/1999 | Berg et al. | |
| 6,237,020 B1 | 5/2001 | Leymann et al. | |
| 6,311,192 B1 | 10/2001 | Rosenthal et al. | |
| 6,349,287 B1 | 2/2002 | Hayashi | |
| 6,487,469 B1 | 11/2002 | Formenti | |
| 6,507,845 B1 | 1/2003 | Cohen et al. | |
| 6,567,804 B1 | 5/2003 | Ramasamy et al. | |
| 6,578,006 B1 | 6/2003 | Saito et al. | |
| 6,678,671 B1 | 1/2004 | Petrovic et al. | |
| 6,725,428 B1 | 4/2004 | Pareschi et al. | |
| RE38,633 E | 10/2004 | Srinivasan | |
| 6,877,153 B2 | 4/2005 | Konnersman | |
| 6,950,802 B1 * | 9/2005 | Barnes et al. ................... 705/7 |
| 7,003,560 B1 * | 2/2006 | Mullen et al. ................. 709/223 |
| 7,216,298 B1 * | 5/2007 | Ballard et al. ................ 715/760 |
| 2003/0086536 A1 * | 5/2003 | Salzberg et al. ............ 379/15.02 |
| 2003/0202638 A1 * | 10/2003 | Eringis et al. .............. 379/15.01 |
| 2005/0114829 A1 * | 5/2005 | Robin et al. .................. 717/101 |
| 2006/0235774 A1 * | 10/2006 | Campbell et al. ............... 705/30 |
| 2007/0150327 A1 * | 6/2007 | Dromgold ......................... 705/8 |

OTHER PUBLICATIONS

Huff et al., "A Plan-based Intelligent Assistant That Supports the Software Development Process", Nov. 1988, ACM SIGSOFT Software Engineering Notes, ACM SIGPLAN Notices, Proceedings of the Third ACM SIGSOFT/SIGPLAN software Engineering Symposium on Practical Software Development Environments, SDE3, p. 97-106.*

Lewis, James P., "The Project Managers Desk Reference: A Comprehensive Guide to Project Planning, Scheduling, Evaluation and Systems", Aug. 24, 2000, McGraw-Hill, 2nd Ed.*

Kerzner, Harold, "Project Management", 1995, Van Nostrand Reinhold, 5th Ed., p. 59,62-3,106-7,155,243,362-3,365,366,398,400,402,408,410-1,468,483,485-6,575,583,604,605,624,630,677,683,686-7,688.710-1,724,725,734,738,742,743,745,751,756,757,772, 777-778,800-1, 815,825,827,829,831,886-8,894-6,902-3,1012,1048,1050.*

Chatfield et al., "Step by Step Microsoft Office Project 2003", Sep. 24, 2003, Microsoft Press. Retrieved electronically* via Safari Books on Sep. 18, 2006, Ch. 6. p. 1-2*, Ch. 15: p. 1-9*.*

(Continued)

*Primary Examiner* — Khanh Pham

(57) ABSTRACT

Software release validation is disclosed. A plan of record is provided, having entity information for a software application associated with a plurality of platforms, and planning information for a plurality of releases of the software application. A set of rules is provided having at least a first object representing an instance of an entity type, a second object, and an operator for expressing a date dependency between the first object and the second object. An event is detected, and the plan of record is validated against the set of rules responsively to the event.

30 Claims, 5 Drawing Sheets

OTHER PUBLICATIONS

Pyron, Tim, "Sams Teach Youself Microsoft Project 2000 in 24 Hours", Apr. 2000, Sams Publishing. P. front cover, copyright p. 355, 371,381, 455, 480, 481.*

Baker et al., "Recent Advances in R&D Benefit Measurement and Project Selection Methods", Jun. 1975, Management Science, p. 1164-1175.*

Kerzner, Harold, "Applied Project Management: Best Practices on Implementation", Dec. 17, 1999, Wiley, p. 37, 59, 90, 226, 261,343. (Kerzner2) Retrieved book entry and capitalized phrase list rom Amazon.com on Sep. 26, 2006.*

IEEE, "The Authoritiative Dictionary of IEEE Standards Terms", Dec. 2000, IEEE Press, p. vi, 207.*

* cited by examiner

SOFTWARE RELEASE VALIDATION

BACKGROUND

Large companies operate in an increasingly complex, heterogeneous and dynamic environment. Generally, a large company is made up of divisions, and each division comprises or hosts businesses. Each business may sponsor the development, deployment, and maintenance of software applications or programs, and a typical software application may be segmented into parallel or sequential development projects. A typical development project may comprise service requests to add new, or change existing, functionality. Each project may be associated with one or more software releases. A software release is the coordinated deployment of a set of projects, from any number of software applications, which may be moved jointly to production on a specific date, worldwide or in a specific region, for a specific production environment or platform.

In a typical example, every time a large software application needs to go live on multiple platforms, managers and planners generally set up and schedule a number of parallel releases. When priorities shift, or projects fall behind schedule, the planners generally are required to assess the impact of such events, and make last-minute changes, often resulting in unsatisfactory delay or expense, or putting operations of the business at risk.

In order to control development networks of this complexity, an organization needs to manage (a) its individual requests, projects, software applications, releases, and platforms, and (b) the dependencies between them. Managing dependencies can be a daunting task, given increasing complexity and rate of change. In addition, dependencies typically cross the boundaries of single businesses, organizations, regions, functions, and processes, thus requiring systematic collaboration between stakeholders.

SUMMARY

In an aspect of the invention, software release validation is disclosed. A plan of record is provided, having entity information for a software application associated with a plurality of platforms, and planning information for a plurality of releases of the software application. A set of rules is provided having at least a first object representing an instance of an entity type, a second object, and an operator for expressing a date dependency between the first object and the second object. An event is detected, and the plan of record is validated against the set of rules responsively to the event.

It is to be understood that both the foregoing general description and the following detailed description are exemplary and explanatory and are intended to provide further explanation of the invention as claimed.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Overview

Communication and collaboration in large companies may be enhanced by tools specifically designed to plan and manage inter-connected software releases, which systematically accommodate individual development projects and dependencies across development networks.

Illustrative Computing Environment

Figure 1:
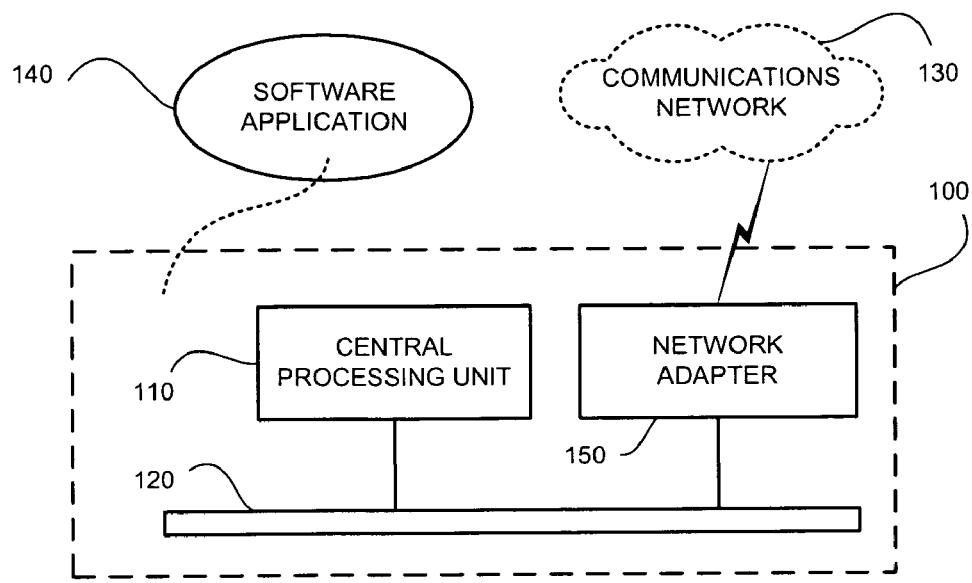
FIG. 1 is a block diagram of an exemplary computing environment in accordance with an implementation of the herein described systems and methods.

Referring to the drawings, in which like reference numerals indicate like elements, FIG. 1 depicts an exemplary computing system 100 in accordance with herein described systems and methods. The computing system 100 is capable of executing a variety of computing applications such as software application 140. Software application 140 can comprise a computing application, a computing applet, a computing program, or other set of instructions operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors.

It is appreciated that although an illustrative computing environment is shown to comprise the single CPU 110 that such description is merely illustrative as computing environment 100 may comprise a number of CPUs 110. Additionally computing environment 100 may exploit the resources of remote CPUs (not shown) through communications network 130 or some other data communications means (not shown).

In operation, the CPU 110 fetches, decodes, and executes instructions, and transfers information to and from other resources via the computer's main data-transfer path, system bus 120. Such a system bus connects the components in the computing system 100 and defines the medium for data exchange. Components that may be connected to the system bus 120 include extension cards, controllers such as a peripherals controller and a memory controller, memory devices such as random access memory (RAM) and read only memory (ROM), and CPU 110.

Further, the computing system 100 may contain network adaptor 150 which may be used to connect the computing system 100 to an external communication network 130. The communications network 130 may provide computer users with connections for communicating and transferring software and information electronically. Additionally, communications network 130 may provide distributed processing, which involves several computers and the sharing of workloads or cooperative efforts in performing a task. It will be appreciated that the network connections shown are exemplary and other means of establishing a communications link between the computers may be used.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Illustrative Computer Network Environment

Figure 2:
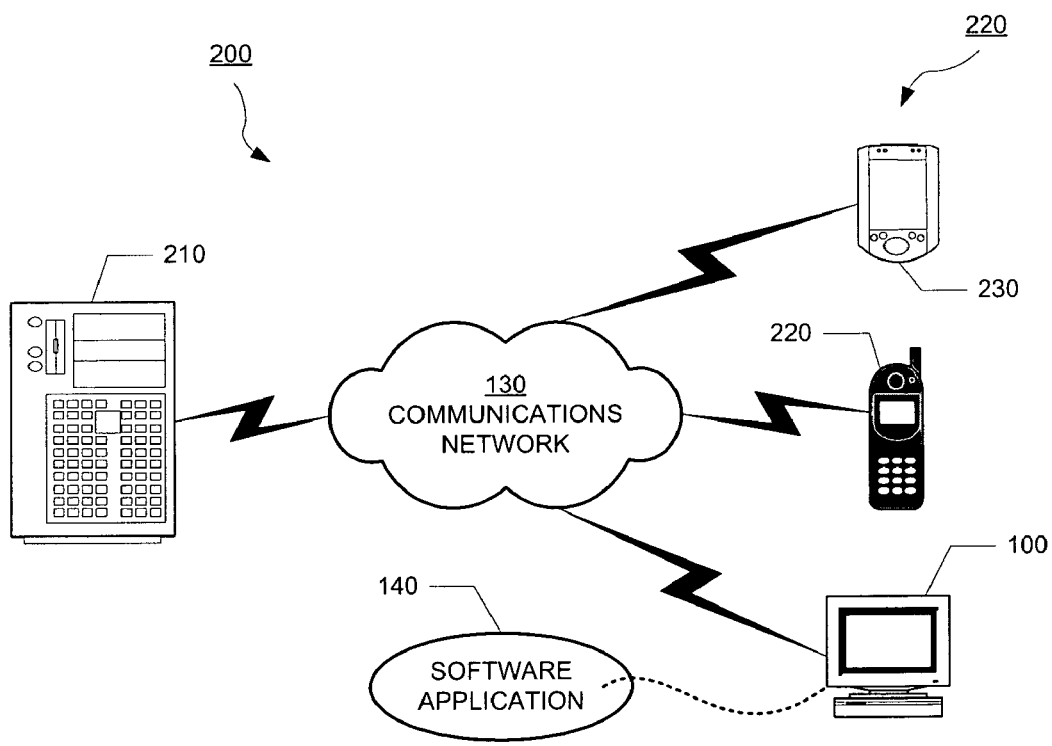
FIG. 2 is a block diagram showing the cooperation of exemplary components of an exemplary data communications architecture, in accordance with an embodiment.

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication with client computers via a communications network, in which the herein described apparatus and methods may be employed. As shown in FIG. 2, server 210 may be interconnected via a communications network 130 (which may be either of, or a combination of a wired or wireless LAN, WAN, intranet, extra net, peer-to-peer network, the Internet, or other communications network) with a number of exemplary client computing environments such as personal computer 100, telephone 220 (such as a wired or mobile telephone), and personal digital assistant 230 (collectively client computing environments 220). In a network environment in which the communications network 130 is the Internet, for example, server 210 can be one or more dedicated computing environment servers operable to process and communicate data to and from exemplary client computing environments 220 via any of a number of protocols, such as hypertext transfer protocol (HTTP), file transfer protocol (FTP), simple object access protocol (SOAP), wireless application protocol (WAP), etc. Each exemplary client computing environment 220 can be equipped with a software application 140, such as a browser or operating system, operable to support one or more computing applications to gain access to server computing environment 210.

In operation, a user (not shown) may interact with a computing application running on a client computing environment to obtain desired data and/or computing applications. The data and/or computing applications may be stored on server computing environment 210 and communicated to cooperating users through exemplary client computing environments 220, over exemplary communications network 130. Server computing environment 210 may host computing applications, processes and applets for the generation, authentication, encryption, and communication of web services and may cooperate with other server computing environments, service providers, or storage providers (not shown), to realize such web services transactions.

Illustrative Development Network and Plan of Record

Figure 3:
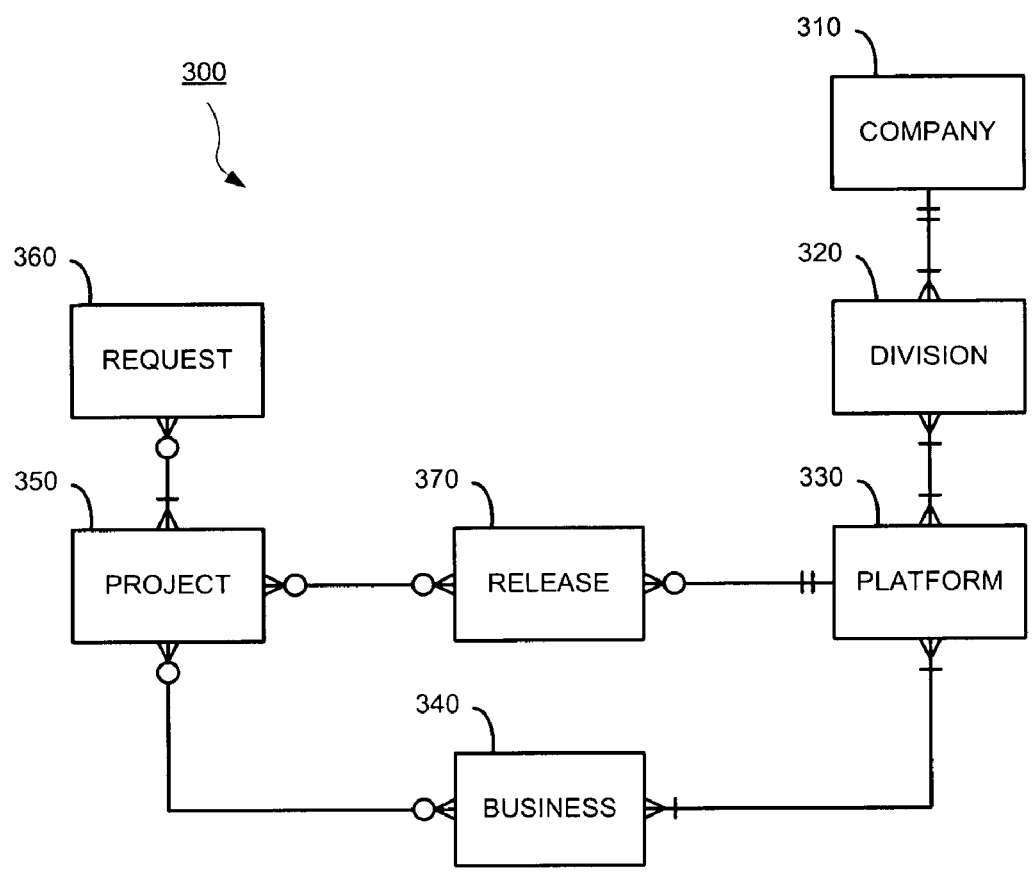
FIG. 3 is an entity relationship diagram illustrating a development network for practicing an embodiment of the invention.

FIG. 3 is an entity relationship diagram illustrating a development network 300 for practicing an embodiment of the invention. The development network 300 is a model used to capture dependencies in the process of software development, deployment, and maintenance. An exemplary development network 300 comprises entity types, which are software representations for modeling selected attributes of a business concept. Exemplary entity types include a company 310, a division 320, a platform 330, a business 340, a project 350, a request 360, and a release 370. It is possible for any of numerous other entity types to be modeled in the development network 300, as may be desired.

For each entity type 310-370, the development network 300 may comprise zero instances, one instance, or a plurality of instances of the entity type 310-370. Each instance of an entity type 310-370 has a primary key (i.e., a unique identifier), and one or more attributes.

The exemplary development network 300 also comprises entity relationship types, which are shown in FIG. 3 using entity relationship diagraming notation for connections between the entity types 310-370. Entity relationship types follow minimum and maximum carnalities. Cardinally specifies how many instances of an entity type 310-370 relate to one instance of another entity type 310-370.

Entity relationship types may also be used to map constraints between any two instances of entity types 310-370. Constraints between entity types 310-370 (whether business, technical, resource, infrastructure or support-related) may be synthesized into date dependencies, as discussed more fully below. Entity relationship types may be recursive (e.g., project 350 to project 350, or release 370 to release 370, or business 340 to business 340, which are not shown), or may be hierarchical (e.g., request 360 to project 350, or project 350 to release 370).

In the exemplary development network 300 illustrated in FIG. 3, the entity relationship type from company 310 to division 320 is one to many. This models the typical case, for real-world business entities, in which one large company 310 generally has multiple divisions 320.

The entity relationship type from division 320 to company 310 is one and only one; that is, in the exemplary development network 300 shown in the drawing, there is one company 310 and there may be no more than one company 310. However, in other embodiments of a development network 300, a plurality of companies 310 may be permitted.

The illustrated entity relationship type from division 320 to platform 330 is one to many, and from platform 330 to division 320 is one to many. This models a typical real-world situation in which any corporate division 320 may support one or more platforms 330, and any platform 330 may be implemented in one or more divisions 320 of the company 310. Platform 330 may be an operating system, hardware or software architecture, computing environment, software application, information management or enterprise services platform, or business solution (e.g., my sap, R/3, other products of SAP AG, and the like) with which a release 370 of program 140 is designed to operate compatibly.

The illustrated entity relationship type from platform 330 to business 340 is one to many, and from business 340 to platform 330 is one to many. This models the typical real-world situation in which any business unit 340 may support one or more computing platforms 330, and any computing platform 330 may be implemented in one or more business units 340.

The illustrated entity relationship type from platform 330 to release 370 is one to zero or more, and from release 370 to platform 330 is one and only one; that is, in the exemplary development network 300 shown in the drawing, a release 370 may be associated only with a single platform 330. This models the general reality, in software development, that a release 370 of a software application 140 is specifically targeted for a particular supported platform 330.

The illustrated entity relationship type from release 370 to project 350 is one to zero or more, and from project 350 to release 370 is one to zero or more. This models the typical real-world situation in which, at any given time, a release 370 may require zero or more projects 350. For example, a release 370 that is deemed to be complete and requires no further work would be associated with zero projects 350. Similarly, a project 350 may support or otherwise affect zero or more releases 370.

The illustrated entity relationship type from business 340 to project 350 is one to zero or more, and from project 350 to business 340 is one to zero or more. This models the typical real-world situation in which, at any given time, any business unit 340 may be involved in zero or more projects 350 of the development network 300. Similarly, any project 350 may be associated with zero or more business units 340 for implementing the project 350. For example, it may be known that a project 350 is necessary, but at a given time, no business unit 340 has assumed responsibility for implementing the project 350, or a project is generic in nature and not logically associated with only one single business.

Finally, the illustrated entity relationship type from project 350 to request 360 is one to zero or more, and from request 360 to project 350 is one to one or more. This models the typical real-world situation in which a project 350 is composed of zero or more specific tasks, each represented by a request 360, and a request 360 is associated with at least one project 350.

Figure 4:
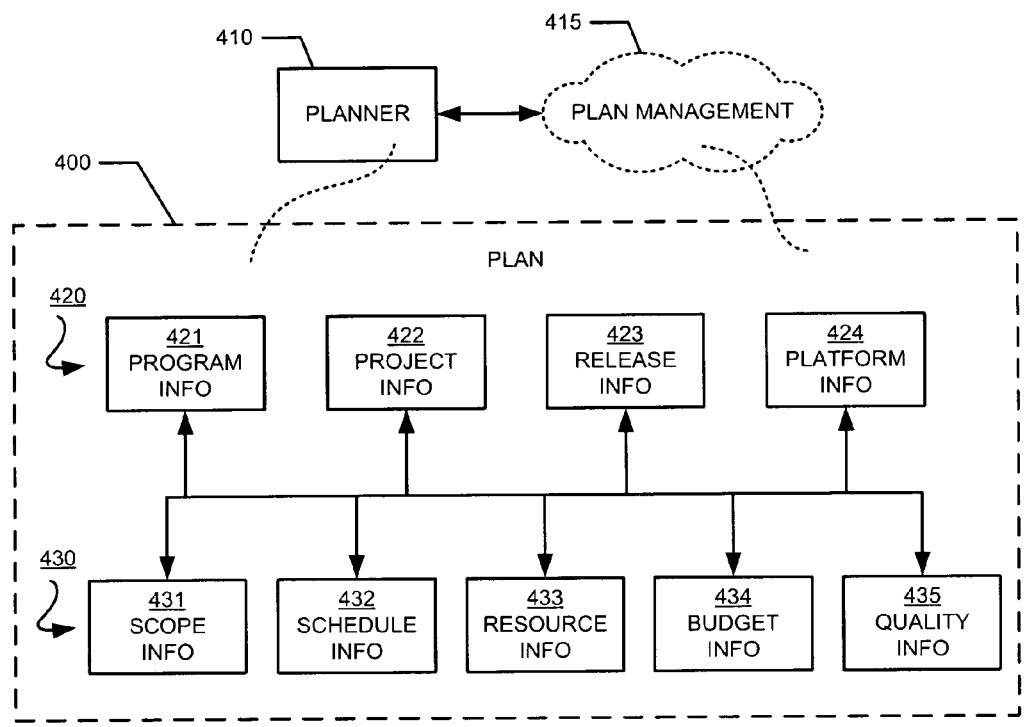
FIG. 4 is a diagram illustrating data flow for an exemplary plan of record for practicing an embodiment of the invention.

FIG. 4 is a diagram illustrating data flow for an exemplary plan of record 400 for practicing an embodiment of the invention. A plan of record 400 may store or embody information corresponding to the entity types 310-370 and entity type relationships defined by the development network 300. The plan of record 400 is created and maintained by at least one planner 410, for planning and management of releases 370 of a software application 140. Planner 410 may, for example, be a program manager, project manager, release manager, or other type of planning or management personnel at any level, or a personnel resource assigned to a project 350. Planner 410 uses software, tools, or other processes for plan of record management 415, to create or maintain the plan of record 400. For example, a plurality of planners 410 may be assisted by collaborative software for plan management 415. Planner 410 may have full access rights or a selected subset of access rights, such as to read, create, modify, or delete data, in all or portions of the plan of record 400. In some embodiments, the plan of record 400 comprises entity information 420 and planning information 430, which may be represented in a language such as XML (extensible Markup Language) or the like.

In an illustrative example within a company 310 that is a large organization, consensus may be reached or imposed between and among planners 410 for one or more platforms 330, and planners 410 (e.g., development teams) for one or more software applications 140 for creation of a plan of record 400. Consensus may be achieved, for example, on principles such as basic conceptual software planning; development, deployment and support principles; a common terminology; collective planning (e.g., strategic and tactical planning); methodologies for plan management 415; a software life cycle for each software application 140; and other key attributes of a mature information technology organization (e.g., commitment to quality, professional software metrics, formal management-of-change and escalation procedures, formal governance structure, etc.). In addition, planners 410 may be expected to agree to a set of common guidelines for managing releases 370. Exemplary guidelines include: the separation of fundamental channels to production (e.g., development releases 370 for new functionality, support releases 370 for non-critical defect fixes, and emergency patch releases 370 for critical defect fixes); common principles governing releases 370 (e.g., a decision to follow a pre-defined, published schedule); a globally shared calendar of releases 370 for all channels to production; and an agreed-upon and communicated schedule for planned computer system downtimes (such as those caused by software releases 370 or by hardware intervention and maintenance on a server 210).

In some embodiments, an integrated plan of record 400 may be created as a single, central repository for all development and support activities on all platforms 330 in question. In other embodiments, a plan of record 400 may be maintained for each platform 330. It may be desirable for a planner 410 to take steps to ensure that no shadow projects (i.e., projects 350 engaged in by resources of a business 340 without being entered or described in the plan of record 400) are to be permitted, regardless of the size or type of such shadow projects 350.

The plan of record 400 may include entity information 420, such as program information 421 describing software applications 140, project information 422 describing projects 350, release information 423 describing releases 370, and platform information 424 describing platforms 330. The plan of record 400 also includes planning information 430, which may be associated with entity types 310-370 or with entity information 420. Planning information 430 may include, for example, scope information 431, schedule information 432 (such as a release calendar, an example of which is shown in Table 1 below), resource information 433 (such as personnel data), budget information 434, and quality information 435. Quality information 435 may, for example, include the status of desired quality analyses and reviews. For example, an architecture review may ensure proper design of a project 350; an infrastructure review may ensure that projects 350 obtain a desired technical infrastructure and are supportable; a resource review may ensure that appropriate staffing may be secured for a project 350; and a release deployment review may prevent conflicts between concurrent projects 350 within a release 370.

It is desirable to obtain mutual agreement among planners 410 concerning events to be represented in schedule information 432, so that releases 370 remain in compliance with the schedule information 432. Table 1 is an illustrative example of schedule information 432 comprising an exemplary release calendar, represented as a fragment of XML-like pseudo code. The exemplary pseudo code of Table 1 shows schedule information 432 in which a release calendar section, tagged with the name "REL-CAL", includes a section tagged "year" having the value "2004." Entries are defined in the year section for four sections tagged "month," each having one or more day entries tagged "day." An exemplary day entry has a numeric value (e.g., the day of the month) and a textual description, describing an event planned to take place on the corresponding day. In alternate implementations, days or dates may be represented as offsets from a selected starting date, such as a kickoff date for a project 350, or a calendar date such as the first day of a fiscal year or calendar year.

TABLE 1

```
<calendar name="REL-CAL">
    <year value="2004">
        <month value="9">
            <day value="13" description="Sep 04 Release"/>
        </month>
        <month value="10">
            <day value="28" description="FYE04 Release I"/>
        </month>
        <month value="11">
            <day value="1" description="FYE04 Release II"/>
```

TABLE 1-continued

```
            <day value="5" description="FYE04 Release III"/>
            <day value="15" description="Nov 04 Release"/>
        </month>
        <month value="12">
            <day value="13" description="Dec 04 Release"/>
        </month>
    </year>
</calendar>
```

A plurality of platforms 330 may be described using a plurality of plans of record 400, or in a single plan of record 400 for multiple platforms 330. It is desirable to provide easy visibility to planners 410 of all plans of record 400, along with the entity types 310-370 and entity type relationships described in the plan of record 400. In some implementations, logical connections may be established between platforms 330 by providing via crosslinkages (e.g., hypertext links) between peer websites, allowing planners 410 to easily view each other's plans of record 400, identify conflicts, and make necessary adjustments, as appropriate.

In an exemplary implementation, the contents of plan of record 400 should be substantially complete, should be frequently updated or kept up-to-date on a real-time basis, and should be published to planners 410 via communications network 130 (e.g., the Internet, or an intranet of company 310). A centralized and accurate plan of record 400 may serve as a reference for numerous geographically and organizationally dispersed planners 410 and other stakeholders.

Illustrative Rule Engine and Rules

Figure 5:
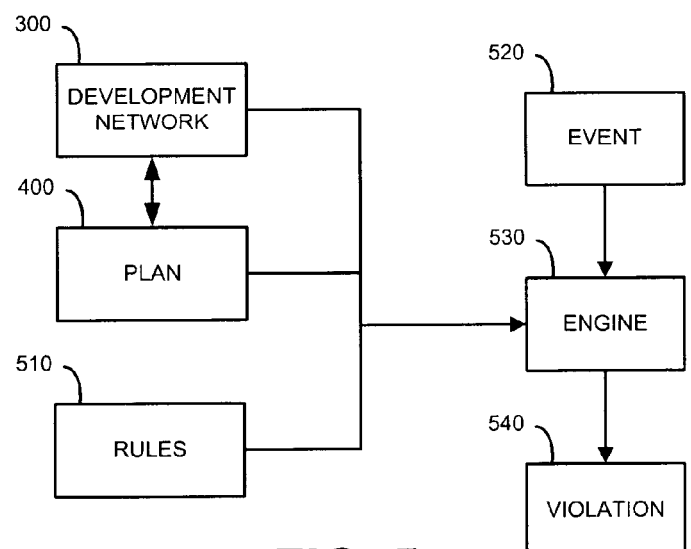
FIG. 5 is a diagram illustrating data flow for a rule engine for an embodiment of the invention.

FIG. 5 is a diagram illustrating data flow for a rule engine 530 for an embodiment of the invention. Information corresponding to the entity types 310-370 and entity type relationships defined by the development network 300 is stored or embodied in plan of record 400. One or more plans of record 400 may be evaluated by rule engine 530. Rule engine 530 is able to evaluate rule set 510, and apply rule set 510 to the information in plan of record 400. Rule engine 530 is also invoked by, or is otherwise able to respond to, a triggering event 520. In response to the event 520, the rule engine 530 may detect a violation 540 of the rule set 510.

Aspects of the invention facilitate separation between the plan of record 400 and the rule set 510. The rule set 510 need not be created, updated, or maintained by the same planners 410 who have responsibility for creating, updating. or maintaining the plan of record 400. Rather, it may be desirable for different planners 410 to create, update, and maintain the rule set 510.

Rule engine 530 may, for example, iterate through the rule set 510 (e.g., a rule set 510 comprising one or more XML documents, and defining interdependencies), one rule at a time. Rule engine 530 may evaluate each rule of rule set 510 against plans of record 400, and reaches one of two possible outcomes: either all rules are observed, hence the plans of record 400 are in an equilibrium, or at least one rule is violated, hence the plans of record 400 are out of equilibrium.

The rule engine 530 may then notify planners 410 of result information (e.g., violated rules, rule descriptions, error diagnoses), such as by email to planners 410, or by publication on the plan management tool 415 or a web site accessible to planners 410. Planners 410 are thus able to determine the root cause of a state of disequilibrium, and are able to effect adjustments to the plans of record 400 in order to synchronize or re-synchronize the plans of record 400.

A triggering event 520 causes invocation of the rule engine 530. In some implementations, a planner 410 may trigger invocation of the rule engine 530 by generating an event 520.

In further implementations, a triggering event 520 may be caused by modifications to the rule set 510 or to the development network 300 or a plan of record 400. It is desirable for planners 410 to understand possible ramifications, as soon as an event 520 occurs, which could potentially throw plans of record 400 out of equilibrium. Hence, aspects of the invention address time-dependent behavior of entity types 310-370. The rule engine 530 is concerned with states of entity types 310-370, transitions between such states, and events 520 that cause these transitions.

An event 520 may include any noteworthy change in the state of an entity type 310-370, to which planners 410 must react. For example, an event 520 may include external events 520 (e.g., a project 350 has been rescheduled, a new release 370 has been added to the plan of record 400, a new interdependency rule has been created in rule set 510), and may include temporal events (e.g., the end of a fiscal year). Each event 520 is able to trigger the rule engine 520 to begin validating the integrity of the modeled plans of record 400 against the rule set 510. Thus, a disequilibrium (e.g., an out-of-sync situation within a plan of record 400, or between plans of record 400) may be detected and resolved by a planner 410 proactively at the earliest possible time.

Figure 6:
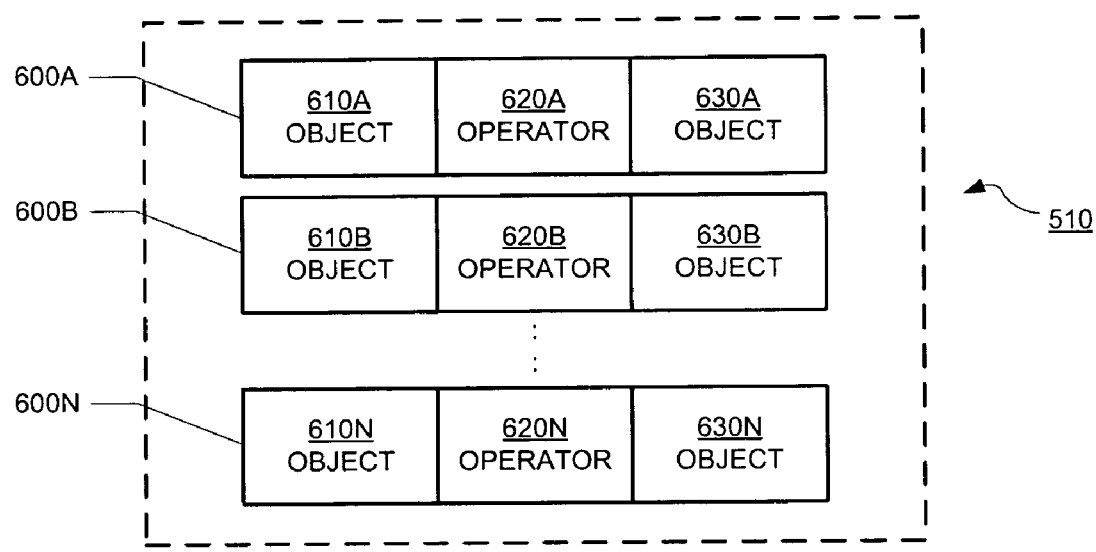
FIG. 6 is a diagram depicting components included in an exemplary rule set for an embodiment of the invention.

FIG. 6 is a diagram depicting components included in an exemplary rule set 510 for an embodiment of the invention. The rule set 510 includes rules for reflecting dependencies (e.g., date dependencies) by means of constraints between any two entity types 310-370, such as rules 600A, 600B, . . . 600N (collectively, rules 600).

The rule set 510 comprises rules 600 having first objects 610A, 610B, . . . , 610N (collectively, first objects 610), operators 620A, 620B, . . . , 620N (collectively, operators 620), and second objects 630A, 630B, . . . , 630N (collectively, second objects 630). First and second objects 610, 630 are operands of the operator, and may, for example, correspond to XML objects, objects in an object-oriented programming language (e.g., C++, Java), and the like. An exemplary rule 600A comprises a first object 610A, an operator 620A, and a second object 630A. Rules 600 may in some implementations include such further information as may be desired by planners 410.

Practical constraints identified by planners 410 (whether business, technical, resource, infrastructure or support-related) may be expressed as date dependencies via the rules 600. Each one of the rules 600 is associated with one entity type relationship, in which the first object 610 may be dependent upon the start or finish of the second object 630 (or may depend upon being within a set of dates).

The two objects 610, 630 are linked in the rules 600 via operators 620. Operators 620 reflect constraint types such as less than (i.e., the date associated with first object 610 falls before the date associated with second object 630), greater than (i.e., the date associated with first object 610 falls after the date associated with second object 630), less-or-equal, greater-or-equal, equal, not equal, and set relationships such as in-set (i.e., the date associated with first object 610 falls within a set of dates defined by second object 630), and not-in-set (i.e., the date associated with first object 610 does not fall within a set of dates defined by second object 630). Table 2 is an illustrative, non-exhaustive list of operators 620:

TABLE 2

| ID | Operator | Description |
| --- | --- | --- |
| 1 | equal | if A then B |
| 2 | not-equal | if A then NOT B |

TABLE 2-continued

| ID | Operator | Description |
| --- | --- | --- |
| 3 | less | if A then B before |
| 4 | not-less | if A then B NOT before |
| 5 | in-set | A IN set C |
| 6 | not-in-set | A NOT IN set C |

In a first example of a rule 600, a large integrated business software application 140, consisting of two projects 350 (identified as A and B), must be moved to production on platforms 330 (identified as C and D) at the same time. A rule 600 may be expressed as "C.A equal D.B". This example illustrates an inter-project 350 dependency: the rule 600 causes a violation 540 to be identified, if an event 520 takes place in which the go-live date of either project 350 is changed. The dates of both projects 350 must either be kept equal by planners 410, or both dates must be changed in synchronization by planners 410.

In a second example of a rule 600, a release 370 (identified as A) on a platform 330 (identified as B) must comply with schedule information 432 comprising a companywide release calendar (identified as C). A rule 600 may be expressed as "B.A in-set C". This example illustrates an inter-release 370 dependency: releases 370 can be moved to production independently, but only within a set of predefined calendar dates identified in the release calendar. This allows enforcing a common release calendar across one or many organizations (such as company 310, division 320, or business 340), which may dramatically simplify the coordination of deployments of a project 350 or release 370.

Using aspects of the invention, one skilled in the art may readily create rules 600 for situations such as the following illustrative examples: (1) large software applications 140 with multiple sub-projects 350 on multiple platforms 330 go live on the same day, (2) a new software application 140 for a central service is introduced to all customers across all clients 220 on the same day, (3) a release calendar is enforced to ensure that applications 140 are moved to production at the same time, (4) downstream interfaces must be changed and regression-tested when impacted by central releases 370, (5) releases 370 are to be done in a certain sequence (e.g., month-end before quarter-end before year-end), (6) a second project 350 may be started only after a first project 350 is completed; (7) enforcement of priorities (e.g., do not start low-priority projects 350 until higher-priority projects 350 are completed), and (8) avoid implementing two high-risk projects 350 at the same time.

Table 3 is an illustrative example of a rule set 510 comprising four exemplary rules 600, represented as a fragment of XML-like pseudo code. First objects 610 are represented by the tag "a", and second objects 630 are represented by the tag "b", and operators 620 are represented by the tag "op". The exemplary rules 600 also include rule identifiers (tagged "id"), type identifiers (tagged "type"), and descriptive information (tagged "description").

TABLE 3

```
<rule id="001"
    type="inter-release"
    a.platform="xyz"
    a.release="21"
    op="EQ"
    b.platform="jkl"
    b.release="4"
```

TABLE 3-continued

```
    description="Enforce common release calendar for Program ABC
across all platforms: Platform XYZ September '04 release needs to go
live on the same weekend as the Platform JKL September '04 release"/>
<rule id="002"
    type="inter-release"
    a.platform="xyz"
    a.release="27"
    op="NEQ"
    b.platform="xyz"
    b.release="27"
    description="Enforce release calendar for Program ABC across all
platforms: Quarter-end months (January, April, July, October) are
release-free."/>
<rule id="003"
    type="inter-project"
    a.platform="xyz"
    a.release="21"
    a.project="6.53"
    op="EQ"
    b.platform="jkl"
    b.release="4"
    b.project="2.1"
    description="Enforce project synchronization: all warranty sub-
projects must jointly move to production on the same day (September 13,
2004) across all platforms."/>
<rule id="004"
    type ="release-calendar"
    a.platform="xyz"
    a.release="27"
    op="IN"
    b.calendar="test"
    description="Enforce that the Platform XYZ December Release
will be moved to production on the 13th"/>
```

Exemplary Method

Figure 7:
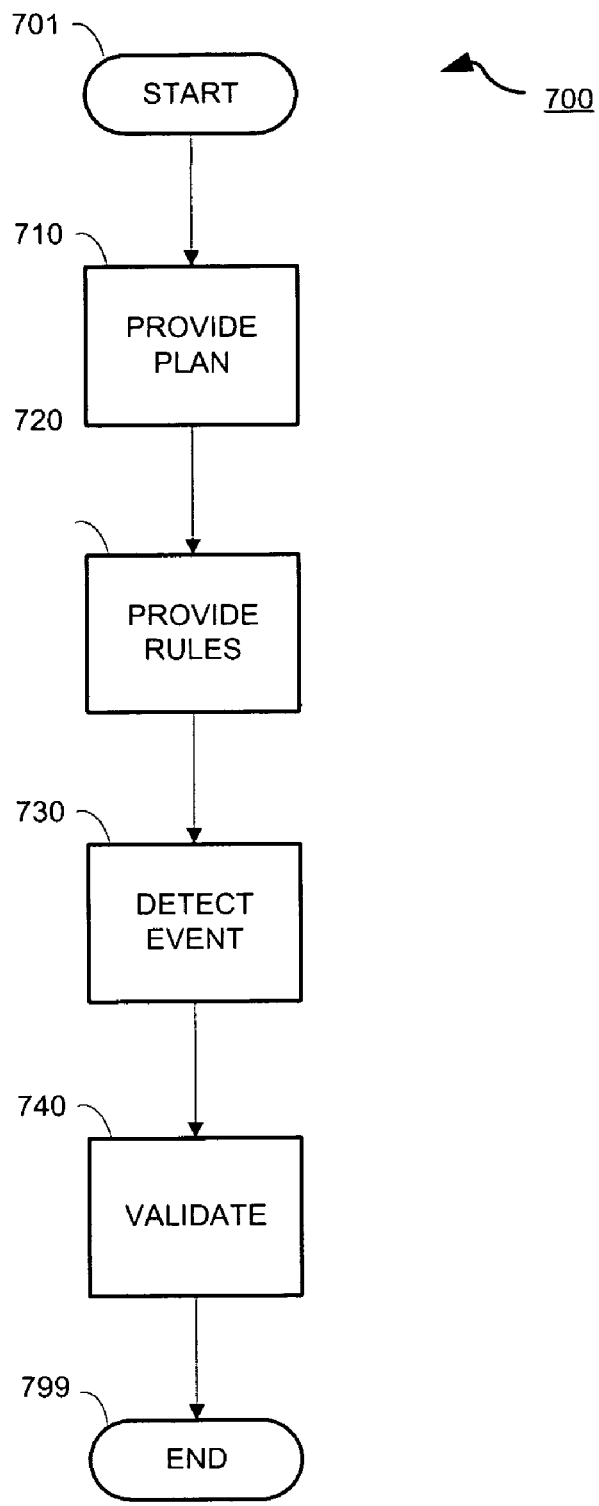
FIG. 7 is a flow chart of a method for software release validation according to an embodiment of the present invention.

FIG. 7 shows a method 700 for software release validation according to an embodiment of the present invention. The method 700 begins at start block 701, and proceeds to block 710. At block 710, at least one plan of record 400 is provided. At block 720, a rule set 510 is provided. At block 730, an event 520 is detected by the rule engine 530. The event 530 triggers validation at block 740. At block 750, notification is provided for the results of the validation step 740. The method 700 then concludes at block 799.

Although exemplary implementations of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A method for software release validation, comprising:
    providing a plan of record comprising entity information for a software application associated with a plurality of platforms, and planning information for a plurality of releases of the software application,
    providing a set of rules comprising at least a first object representing an instance of an entity type, a second object, and an operator for expressing a date dependency between the first object and the second object,
    detecting an event,
    validating the plan of record against the set of rules responsively to the event.

2. The method of claim 1 further comprising notifying a planner of a rule violation.

3. The method of claim 1 wherein providing a plan of record comprises associating the plurality of releases one-to-one with the plurality of platforms.

4. The method of claim 1 wherein the planning information for the plurality of releases comprises schedule information.

5. The method of claim 1 wherein the planning information for the plurality of releases comprises a release calendar.

6. The method of claim 1 wherein the second object represents a second instance of the entity type.

7. The method of claim 1 wherein the second object represents an instance of a second entity type.

8. The method of claim 1 wherein detecting the event comprises detecting a modification of the plan of record.

9. The method of claim 1 wherein detecting the event comprises detecting a modification of the set of rules.

10. The method of claim 1 wherein detecting the event comprises invoking a rule engine.

11. The method of claim 1 wherein validating comprises determining whether a rule violation exists in at least one rule of the set of rules, based upon the date dependency.

12. A system for software release validation, comprising:
a computer apparatus having a plan management capability for allowing a planner to manage a plan of record comprising entity information for a software application associated with a plurality of platforms, and planning information for a plurality of releases of the software application,
the computer being adapted to provide the plan of record to a rule engine able to validate the plan of record against a set of rules responsively to an event, the set of rules comprising at least a first object representing an instance of an entity type, a second object, and means for expressing a date dependency between the first object and the second object.

13. The system of claim 12 wherein the plurality of releases has a one-to-one association with the plurality of platforms.

14. The system of claim 12 wherein the planning information for the plurality of releases comprises schedule information.

15. The system of claim 12 wherein the planning information for the plurality of releases comprises a release calendar.

16. The system of claim 12 wherein the rule engine is able to notify the planner of a rule violation.

17. A system for software release validation, comprising:
a computer apparatus having a rule engine able to validate a plan of record against a set of rules responsively to an event,
the set of rules comprising at least a first object representing an instance of an entity type, a second object, and means for expressing a date dependency between the first object and the second object,
the plan of record comprising entity information for a software application associated with a plurality of platforms, and planning information for a plurality of releases of the software application.

18. The system of claim 17 wherein the second object represents a second instance of the entity type.

19. The system of claim 17 wherein the second object represents an instance of a second entity type.

20. The system of claim 17 wherein the event comprises a modification of the plan of record.

21. The system of claim 17 wherein the event comprises a modification of the set of rules.

22. The system of claim 17 wherein the rule engine is able to determine whether a rule violation exists in at least one rule of the set of rules, based upon the date dependency.

23. A computer-readable storage medium containing a set of instructions for software release validation, the set of instructions comprising steps for:
providing a plan of record comprising entity information for a software application associated with a plurality of platforms, and planning information for a plurality of releases of the software application,
providing a set of rules comprising at least a first object representing an instance of an entity type, a second object, and an operator for expressing a date dependency between the first object and the second object, and
validating the plan of record against the set of rules responsively to an event.

24. The computer-readable medium of claim 23, the set of instructions further comprising steps for notifying a planner of a rule violation.

25. The computer-readable medium of claim 23 wherein providing a plan of record comprises associating the plurality of releases one-to-one with the plurality of platforms.

26. The computer-readable medium of claim 23 wherein the planning information for the plurality of releases comprises a release calendar.

27. The computer-readable medium of claim 23 wherein the event comprises a modification of the plan of record.

28. The computer-readable medium of claim 23 wherein the event comprises a modification of the set of rules.

29. The computer-readable medium of claim 23 wherein validating comprises determining whether a rule violation exists in at least one rule of the set of rules, based upon the date dependency.

30. A system for software release validation, comprising computer apparatus comprising:
plan management means for providing a plan of record comprising entity information for a software application associated with a plurality of platforms, and planning information for a plurality of releases of the software application,
means for providing a set of rules comprising at least a first object representing an instance of an entity type, a second object, and means for expressing a date dependency between the first object and the second object, and
rule engine means for validating the plan of record against the set of rules responsively to an event.

* * * * *